US012664714B2

(12) United States Patent
Liu et al.

(10) Patent No.: US 12,664,714 B2
(45) Date of Patent: Jun. 23, 2026

(54) METHOD, DEVICE, AND COMPUTER PROGRAM PRODUCT FOR IMAGE PROCESSING

(71) Applicant: Dell Products L.P., Round Rock, TX (US)

(72) Inventors: Zhisong Liu, Shenzhen (CN); Zijia Wang, Weifang (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 18/437,926

(22) Filed: Feb. 9, 2024

(65) Prior Publication Data
US 2025/0232510 A1 Jul. 17, 2025

(30) Foreign Application Priority Data
Jan. 12, 2024 (CN) .......................... 202410051817.5

(51) Int. Cl.
| | |
|---|---|
| *G06T 15/00* | (2011.01) |
| *G06T 7/55* | (2017.01) |
| *G06T 7/73* | (2017.01) |
| *G06T 13/20* | (2011.01) |

(52) U.S. Cl.
CPC ................ *G06T 15/00* (2013.01); *G06T 7/55* (2017.01); *G06T 7/74* (2017.01); *G06T 13/20* (2013.01); *G06T 2207/10016* (2013.01); *G06T 2207/10028* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 9,747,716 B1* | 8/2017 | Mallet | .................... | G06T 19/20 |
| 2020/0320727 A1* | 10/2020 | Smolic | .................. | G06T 15/08 |
| 2021/0082135 A1* | 3/2021 | Xu | ........................... | G06T 7/529 |
| 2022/0130056 A1* | 4/2022 | Zhang | .................... | G06T 7/251 |

(Continued)

OTHER PUBLICATIONS

A. Toshev et al., "DeepPose: Human Pose Estimation via Deep Neural Networks," arXiv:1312.4659v3, Aug. 20, 2014, 9 pages.

(Continued)

*Primary Examiner* — Sarah Le
(74) *Attorney, Agent, or Firm* — Ryan, Mason & Lewis, LLP

(57) ABSTRACT
The present disclosure relates to a method, a device, and a computer program product for image processing. The method includes acquiring a plurality of images and a first video, wherein the plurality of images indicate visual information of a source object from a plurality of perspectives, and the first video indicates animation of a target object. The method further includes generating a three-dimensional model for the source object based on the plurality of images, and generating a plurality of animation models for the target object based on the first video. The method further includes fusing the three-dimensional model for the source object and the plurality of animation models for the target object to generate a second video for the source object, wherein in the second video, the target object in the first video is replaced with the source object.

20 Claims, 11 Drawing Sheets

(56) References Cited

U.S. PATENT DOCUMENTS

| | | | | | |
|---|---|---|---|---|---|
| 2023/0123820 | A1* | 4/2023 | Wang | | G06N 3/088 |
| | | | | | 345/474 |
| 2023/0196678 | A1* | 6/2023 | Ju | | G06T 19/20 |
| | | | | | 345/419 |
| 2024/0011790 | A1* | 1/2024 | Numakami | | G01C 21/383 |
| 2024/0104828 | A1* | 3/2024 | Wang | | G06T 15/20 |
| 2024/0185518 | A1* | 6/2024 | Kopp | | G06T 7/13 |
| 2024/0331204 | A1* | 10/2024 | Kadam | | G06T 3/60 |
| 2025/0175694 | A1* | 5/2025 | Xu | | G06T 5/50 |

OTHER PUBLICATIONS

J. Wang et al., "Deep High-Resolution Representation Learning for Visual Recognition," arXiv:1908.07919v2, Mar. 13, 2020, 23 pages.

Z. Cao et al., "OpenPose: Realtime Multi-Person 2D Pose Estimation using Part Affinity Fields," arXiv:1812.08008v2, May 30, 2019, 14 pages.

G. Pavlakos et al., "Coarse-to-Fine Volumetric Prediction for Single-Image 3D Human Pose," arXiv:1611.07828v2, Jul. 26, 2017, 10 pages.

D. Pavllo et al., "3D Human Pose Estimation in Video With Temporal Convolutions and Semi-Supervised Training," arXiv:1811.11742v2, Mar. 29, 2019, 13 pages.

Y. Cheng et al., "Occlusion-Aware Networks for 3D Human Pose Estimation in Video," IEEE/CVF International Conference on Computer Vision, Oct. 2019, 10 pages.

M. Loper et al., "SMPL: A Skinned Multi-Person Linear Model," ACM Transactions on Graphics, vol. 34, No. 6, Nov. 2015, pp. 248:1-248:16.

G. Pavlakos et al., "Expressive Body Capture: 3D Hands, Face, and Body from a Single Image," arXiv:1904.05866v1, Apr. 11, 2019, 22 pages.

N. Mahmood et al., "AMASS: Archive of Motion Capture as Surface Shapes," arXiv:1904.03278v1, Apr. 5, 2019, 12 pages.

A. Kanazawa et al., "End-to-end Recovery of Human Shape and Pose," arXiv:1712.06584v2, Jun. 23, 2018, 10 pages.

M. Kocabas et al., "VIBE: Video Inference for Human Body Pose and Shape Estimation," arXiv:1912.05656v3, Apr. 29, 2020, 12 pages.

S. Saito et al., "PIFu: Pixel-Aligned Implicit Function for High-Resolution Clothed Human Digitization," arXiv:1905.05172v3, Dec. 3, 2019, 15 pages.

S. Saito et al., "PIFuHD: Multi-Level Pixel-Aligned Implicit Function for High-Resolution 3D Human Digitization," IEEE/CVF Conference on Computer Vision and Pattern Recognition, Jun. 2020, 10 pages.

Y. Xiu et al., "ICON: Implicit Clothed Humans Obtained from Normals," arXiv:2112.09127v2, Mar. 28, 2022, 22 pages.

T. Müller et al., "Instant Neural Graphics Primitives with a Multiresolution Hash Encoding," arXiv:2201.05989v2, May 4, 2022, 15 pages.

Sketchfab, "Hulk From the Marvel Cinematic Universe," https://sketchfab.com/3d-models/hulk-from-the-marvel-cinematic-universe-085a33e424854dc09fff5594be4ac557, Accessed Oct. 17, 2023, 4 pages.

Sketchfab, "Human 3D Model Scanned with iPhone X," https://sketchfab.com/3d-models/human-3d-model-scanned-with-iphone-x-73e467dfc8a04914bb314a9410077858, Accessed Oct. 17, 2023, 5 pages.

Ffmpeg, "A Complete, Cross-platform Solution to Record, Convert and Stream Audio and Video," https://ffmpeg.org/, Accessed Oct. 17, 2023, 31 pages.

J. L. Schoenberger, "Colmap," https://colmap.github.io/, Accessed Oct. 17, 2023, 2 pages.

* cited by examiner

100 service unit 103           client 101

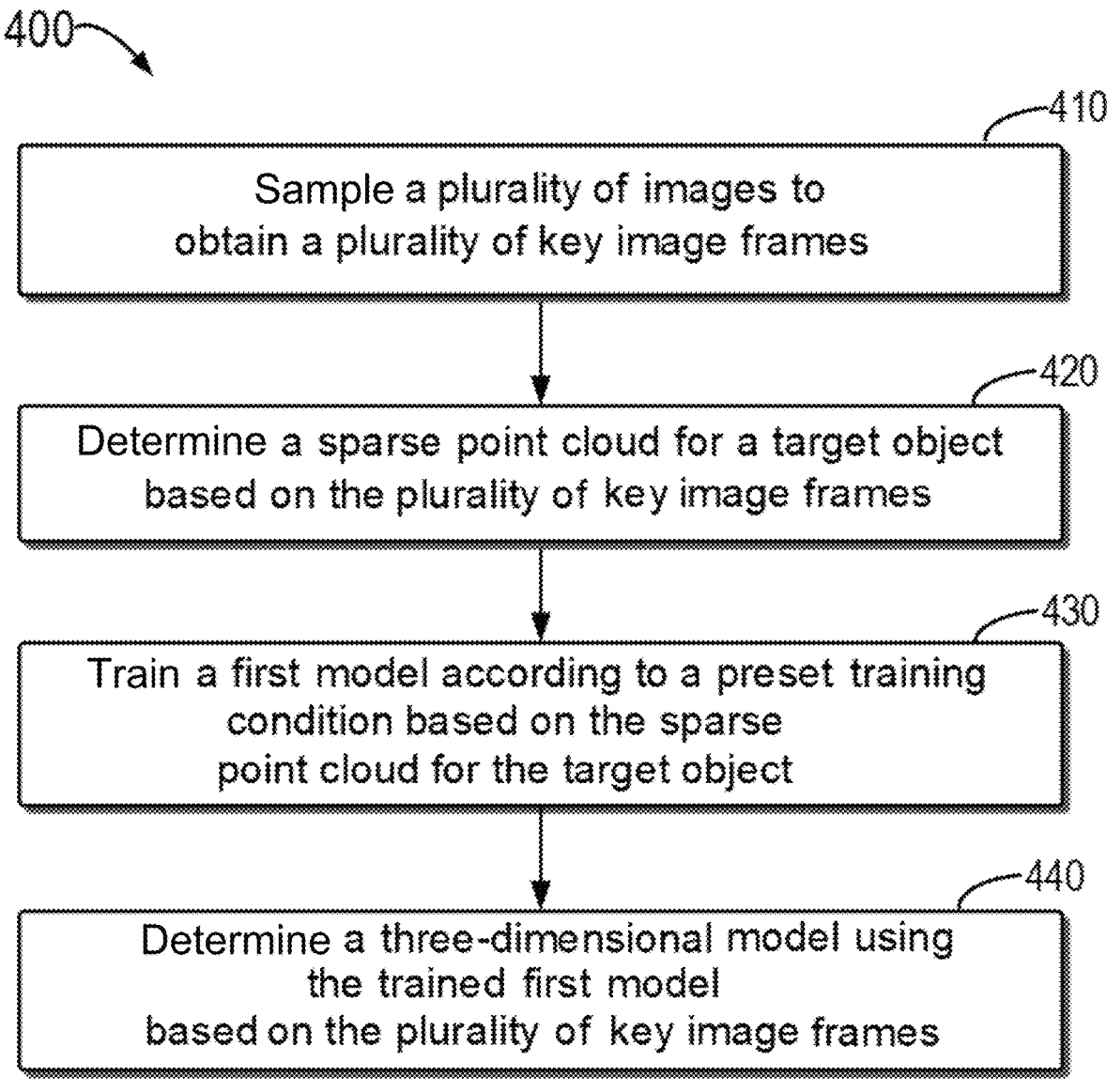

400

410
Sample a plurality of images to
obtain a plurality of key image frames

420
Determine a sparse point cloud for a target object
based on the plurality of key image frames 430
Train a first model according to a preset training
condition based on the sparse
point cloud for the target object 440
Determine a three-dimensional model using
the trained first model
based on the plurality of key image frames

FIG. 4

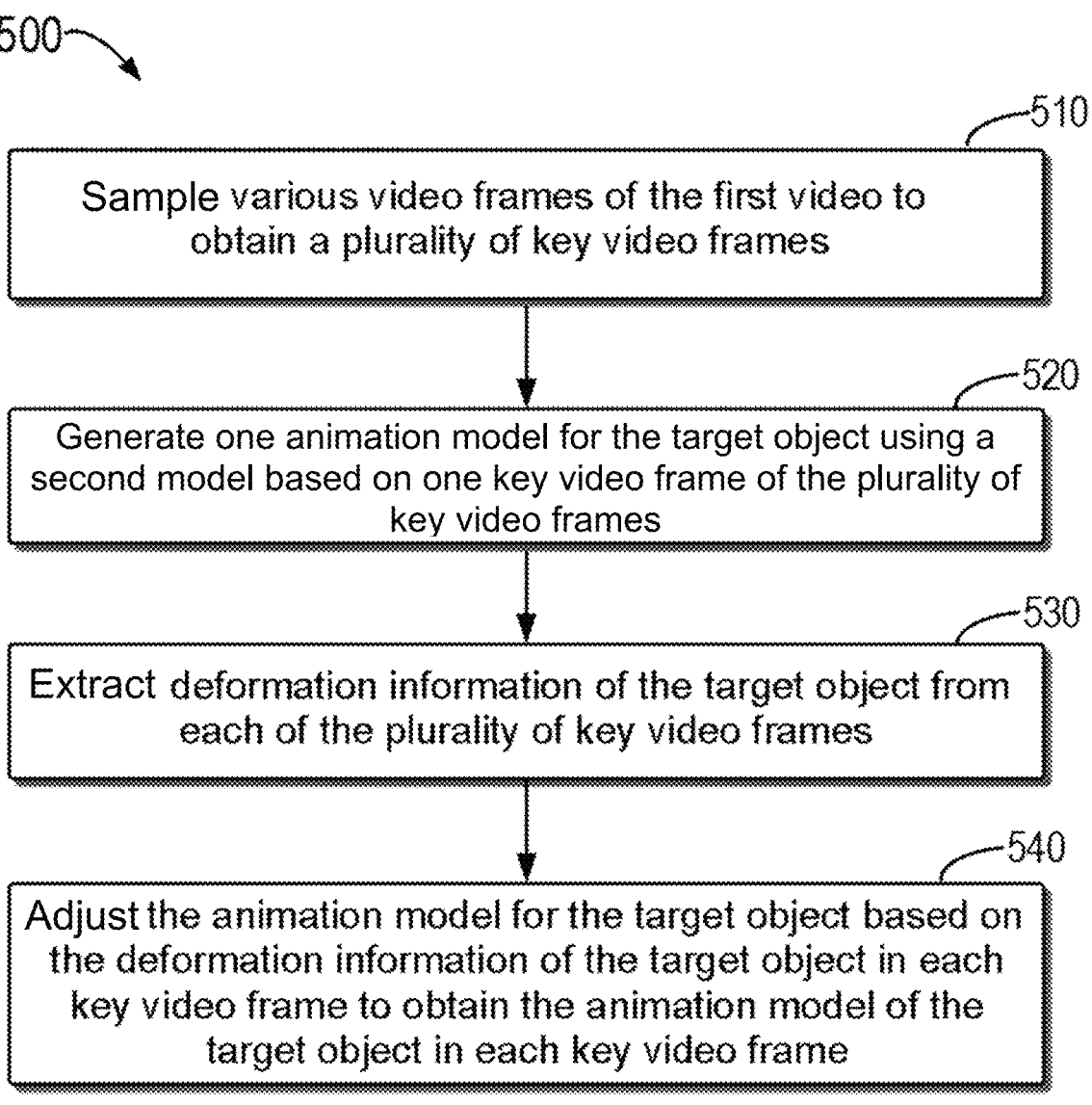

500

510

Sample various video frames of the first video to obtain a plurality of key video frames

520

Generate one animation model for the target object using a second model based on one key video frame of the plurality of key video frames

530

Extract deformation information of the target object from each of the plurality of key video frames

540

Adjust the animation model for the target object based on the deformation information of the target object in each key video frame to obtain the animation model of the target object in each key video frame

FIG. 5 first video
1001 aligned three-dimensional
model without background 1002 second video
1003

METHOD, DEVICE, AND COMPUTER PROGRAM PRODUCT FOR IMAGE PROCESSING

RELATED APPLICATION

The present application claims priority to Chinese Patent Application No. 202410051817.5, filed Jan. 12, 2024, and entitled "Method, Device, and Computer Program Product for Image Processing," which is incorporated by reference herein in its entirety.

FIELD

The present disclosure relates to the field of computers, and in particular, to a method, a device, and a computer program product for image processing.

BACKGROUND

With the rapid development of computer technology, the volume of video data being generated has been dramatically increased, and cyberspace is flooded with a large number of different types of videos. People can download and share these video data freely, and watch the playback content.

Video processing technology allows users to edit video data, such as adjusting the clarity and playback speed of a video, or splicing different videos into one video, and the like. Video synthesis technology is a common video processing technology. People can synthesize elements other than video data into video data, and display the synthesized elements when playing the video, so as to obtain the desired video data through editing.

SUMMARY

Embodiments of the present disclosure provide a method, a device, and a computer program product for image processing.

In a first aspect of embodiments of the present disclosure, a method for image processing is provided. The method includes: acquiring a plurality of images and a first video, where the plurality of images indicate visual information of a source object from a plurality of perspectives, and the first video indicates animation of a target object; generating a three-dimensional model for the source object based on the plurality of images; generating a plurality of animation models for the target object based on the first video; and fusing the three-dimensional model for the source object and the plurality of animation models for the target object to generate a second video for the source object, where in the second video, the target object in the first video is replaced with the source object.

In a second aspect of embodiments of the present disclosure, an electronic device is provided. The electronic device includes at least one processor, and a memory coupled to the at least one processor and having instructions stored therein, wherein the instructions, when executed by the at least one processor, cause the electronic device to perform actions including: acquiring a plurality of images and a first video, where the plurality of images indicate visual information of a source object from a plurality of perspectives, and the first video indicates animation of a target object; generating a three-dimensional model for the source object based on the plurality of images; generating a plurality of animation models for the target object based on the first video; and fusing the three-dimensional model for the source object and the plurality of animation models for the target object to generate a second video for the source object, where in the second video, the target object in the first video is replaced with the source object.

In a third aspect of embodiments of the present disclosure, a computer program product is provided. The computer program product is tangibly stored on a non-transitory computer-readable medium and comprises machine-executable instructions, wherein the machine-executable instructions, when executed by a machine, cause the machine to perform actions comprising: acquiring a plurality of images and a first video, where the plurality of images indicate visual information of a source object from a plurality of perspectives, and the first video indicates animation of a target object; generating a three-dimensional model for the source object based on the plurality of images; generating a plurality of animation models for the target object based on the first video; and fusing the three-dimensional model for the source object and the plurality of animation models for the target object to generate a second video for the source object, where in the second video, the target object in the first video is replaced with the source object.

It should be understood that the content described in this Summary is neither intended to limit key or essential features of embodiments of the present disclosure, nor intended to limit the scope of the present disclosure. Other features of the present disclosure will become readily understood from additional description herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, the same or similar reference numerals represent the same or similar elements, in which:

FIG. 4 is a flow chart of a method for generating a three-dimensional model according to an embodiment of the present disclosure;

FIG. 5 is a flow chart of a method for generating a plurality of animation models for a target object according to an embodiment of the present disclosure;

DETAILED DESCRIPTION

Figure 1:
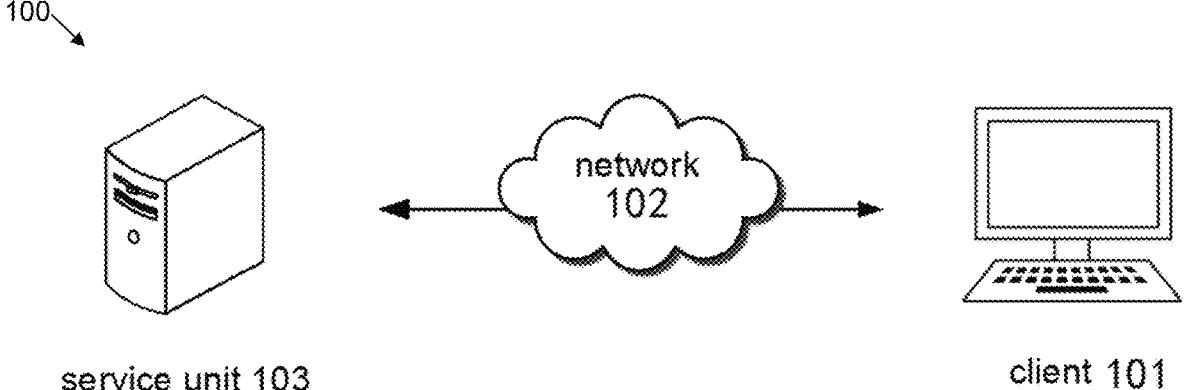
FIG. 1 is a schematic diagram of an example environment in which embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In the prior art related to video synthesis, typically an animation model for a source object is directly constructed by using the visual information of the source object, and then the morphology of the animation model is controlled to generate a series of animations. However, if the animation model is to be directly constructed, the requirements for the visual information of the source object will be very strict, and the existing materials (e.g., the number and resolution of images for the source object, or the video stream for the source object) are often insufficient to construct a good-quality animation model for the source object, such that it is impossible to obtain high-quality synthesized videos.

In view of this, the present disclosure provides a method for image processing. In an embodiment of the present disclosure, the method includes: acquiring a plurality of images and a first video, where the plurality of images indicate visual information of a source object from a plurality of perspectives, and the first video indicates animation of a target object; generating a three-dimensional model for the source object based on the plurality of images; generating a plurality of animation models for the target object based on the first video; and fusing the three-dimensional model for the source object and the plurality of animation models for the target object to generate a second video for the source object, where in the second video, the target object in the first video is replaced with the source object.

Because the static three-dimensional model can express the three-dimensional visual information of the source object more clearly and accurately than a dynamic model, and many animation models can also accurately represent information of actions of the target object in the first video respectively from a three-dimensional perspective, the purpose of replacing the target object in the first video with the source object can be achieved by fusing these two models, and the second video after replacement can clearly and accurately reproduce the scenes in which the source object simulates the actions of the target object. In addition, because the three-dimensional model for the source object is a static model, its demand for visual information of the source object is significantly lower than that of the animation model, so the animation model for the source object can be indirectly established by fusing the three-dimensional model and the animation model, and the method of the present disclosure can use lower-quality visual information to construct a higher-quality animation model and the second video with the target object being replaced while reducing the computation cost.

FIG. 1 is a schematic diagram of an example environment 100 in which embodiments of the present disclosure can be implemented. As shown in FIG. 1, the environment 100 may include a client 101, a network 102, and a service unit 103. The service unit 103 is communicatively coupled with the client 101 through the network 102. The network 102 may be, for example, a Wide Area Network (WAN), a Local Area Network (LAN), a wireless network, a public telephone network, an intranet, and any other type of network well known to those skilled in the art.

In this embodiment, the method for image processing is performed by the service unit 103. The method performed by the service unit 103 includes the following steps. The service unit 103 obtains a plurality of images and a first video from the client 101, wherein the plurality of images indicate visual information of a source object from a plurality of perspectives, and the first video indicates the animation of a target object. It should be noted that the plurality of images may be a plurality of images captured by, for example, a camera, or a plurality of video frames constituting video data. The first video may come from the client 101 or the video data stored locally by the service unit 103.

The service unit 103 generates a three-dimensional model for the source object based on the plurality of images. The service unit 103 may use a local model or call an external model, such as a neural network for image processing, to generate the three-dimensional model for the source object. The three-dimensional model for the source object generated by the service unit 103 is a static model, which can richly show the visual information of the static source object. For example, in the case where the service unit 103 is externally connected with a display, the source object can be observed from various perspectives among the three-dimensional perspectives. Because it is unnecessary to represent the action information of the model, the service unit 103 can construct a realistic three-dimensional model with low computation cost, which reduces the requirements for the hardware configuration of the service unit 103.

The service unit 103 generates a plurality of animation models for the target object based on the first video. The plurality of animation models respectively represent various actions made by the target object in the first video. In these animation models, it is unnecessary for the service unit 103 to render the visual information (e.g., color information, costume information, and decoration information) of the model, so the computational complexity is greatly reduced on the premise of ensuring preparation of representing actions of the target object.

The service unit 103 fuses the three-dimensional model for the source object and the plurality of animation models for the target object to generate a second video for the source object, wherein in the second video, the target object in the first video is replaced with the source object. The service unit 103 can play the second video with an external display (not shown) or transmit the second video to the client 101 through the network 102 for playing.

As shown in FIG. 1, in the environment 100, data can be transmitted between the client 101 and the service unit 103 by using the network 102. For example, a plurality of images can be transmitted from the client 101 to the service unit 103 by using the network 102, so that the plurality of images can be processed in the service unit 103 according to embodiments of the present disclosure. The network 102 has a theoretical bandwidth. The theoretical bandwidth refers to a maximum transmission speed supported by the network 102, which indicates a maximum data amount that can be transmitted by the network 102 in an ideal condition, typically measured by the number of bits transmitted per second (bps). For example, if the theoretical bandwidth of the network 102 is 100 Mbps, this indicates that it can transmit 100 megabits of data per second in an ideal condition. In fact, however, due to other possible factors in the network (e.g., signal interference, bandwidth sharing, transmission delay, and the like), the actual transmission speed may not reach 100 Mbps.

As understood by those skilled in the art, an example of the service unit 103 may be a stand-alone physical server, a server cluster or a distributed system composed of multiple physical servers, or a cloud server that provides basic cloud computing services such as cloud services, cloud databases, cloud computing, cloud functions, cloud storage, network services, cloud communications, middleware services, domain name services, security services, content delivery network (CDN), and big data and artificial intelligence platforms. The server may be connected directly or indirectly through wired or wireless communication, which is not limited in the present application.

The client 101 may be any type of mobile computing device, including mobile computers (e.g., personal digital assistants (PDA), laptop computers, notebook computers, tablet computers, netbooks, or the like), mobile phones (e.g., cellular phones, smartphones, or the like), wearable computing devices (e.g., smart watches, headsets, including smart glasses, and the like), or other types of mobile devices. In some embodiments, the client 101 may also be a fixed computing device, such as a desktop computer, a game machine, a smart TV, and the like.

Figure 2:
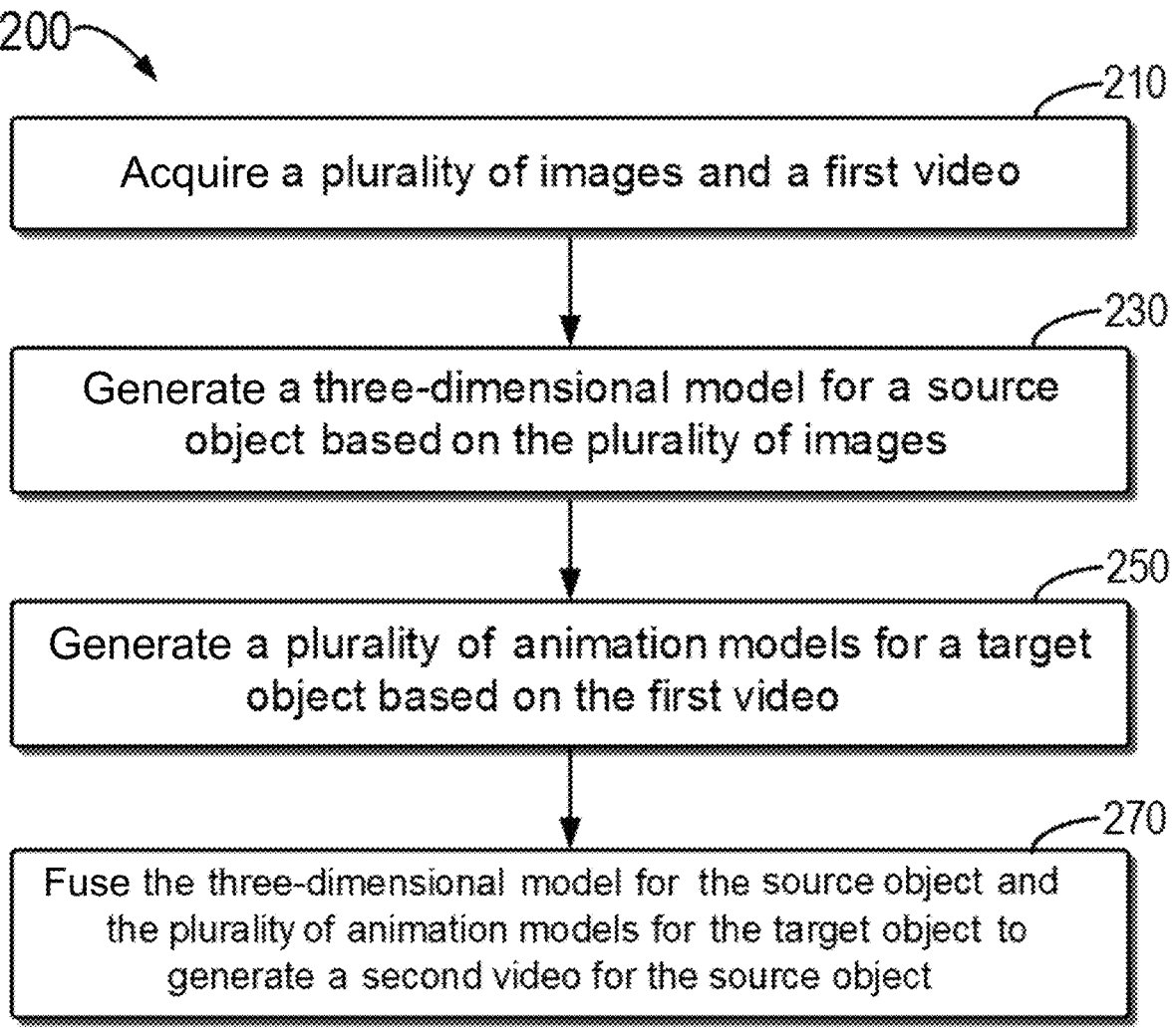
FIG. 2 is a flow chart of a method for image processing according to an embodiment of the present disclosure.

FIG. 2 is a flow chart of a method 200 for image processing according to some embodiments of the present disclosure. As shown in FIG. 2, the method 200 includes blocks 210-270. In block 210, a plurality of images and a first video are acquired, wherein the plurality of images indicate visual information of a source object from a plurality of perspectives, and the first video indicates animation of a target object.

The plurality of images may be images captured by a device such as a camera, or several video frames in a video frame sequence constituting video data. The contents of the plurality of images may include the visual information of the source object from a plurality of perspectives. For example, the plurality of images may include the visual information of the front image, the side image, and the back image of the source object. In some embodiments, in each of the plurality of images, the visual information of the source object is the main part of the whole image, and its posture, shape, and the like in each image remain consistent. For example, a camera can be used to capture a source object in the same static state from a plurality of perspectives. The first video may be a video in any format, which reflects a series of actions made by the target object, including static actions. The source object is the replacement object, and the target object is the replaced object. Since an objective of the present disclosure is to replace the target object in the first video with the source object, it is necessary to acquire the images reflecting the source object and the first video reflecting the target object.

In block 230, a three-dimensional model for the source object is generated based on the plurality of images. The three-dimensional model reflects the model of the source object constructed in the three-dimensional space, in which the visual information of the source object can be acquired from any perspective. The visual information reflected in the three-dimensional space includes not only the visual information included in the plurality of images, but also the visual information not included in the plurality of images, which can be predicted based on the included visual information. Therefore, the three-dimensional model can show all the visual information of the source object in an all-round way, including but not limited to colors, costumes, decorations, and the like. The three-dimensional model is a static one, and it is unnecessary to determine specific action information for it.

In block 250, a plurality of animation models for the target object are generated based on the first video. The plurality of animation models at least include a series of actions of the target object in the first video. For example, if the first video captures the content of the target object playing soccer, the plurality of animation models indicate the actions of the target object when playing soccer in the first video, and each animation model corresponds to one action. It should be noted that the animation model may not reflect the visual information of the target object, that is, it is unnecessary to depict the visual information, such as colors and costumes, of the target object in the animation model, but it is necessary to include posture and shape information, because such information is closely related to the action.

In block 270, the three-dimensional model for the source object and the plurality of animation models for the target object are fused to generate a second video for the source object, wherein in the second video, the target object in the first video is replaced with the source object. In order to replace the target object in the first video with the source object to generate the second video, since the three-dimensional model does not contain action information and the animation model indicates action information, it is necessary to simulate the animation model for the target object by using the three-dimensional model for the source object, that is, to imitate a series of actions of the target object in the first video, so as to obtain the second video in which the source object is in motion.

Because the static three-dimensional model can represent the three-dimensional visual information of the source object more clearly and accurately than a dynamic model, and many animation models can also accurately represent information of actions of the target object in the first video respectively from a three-dimensional perspective, the purpose of replacing the target object in the first video with the source object can be achieved by fusing these two models, and the second video after replacement can clearly and accurately reproduce the scenes in which the source object simulates the actions of the target object. In addition, because the three-dimensional model for the source object is a static model, its demand for visual information of the source object is significantly lower than that of the animation model, so the animation model for the source object can be indirectly established by fusing the three-dimensional model and the animation model, and the method of the present disclosure can use lower-quality visual information to construct a higher-quality animation model and the second video with the target object being replaced while reducing the computation cost.

Figure 3:
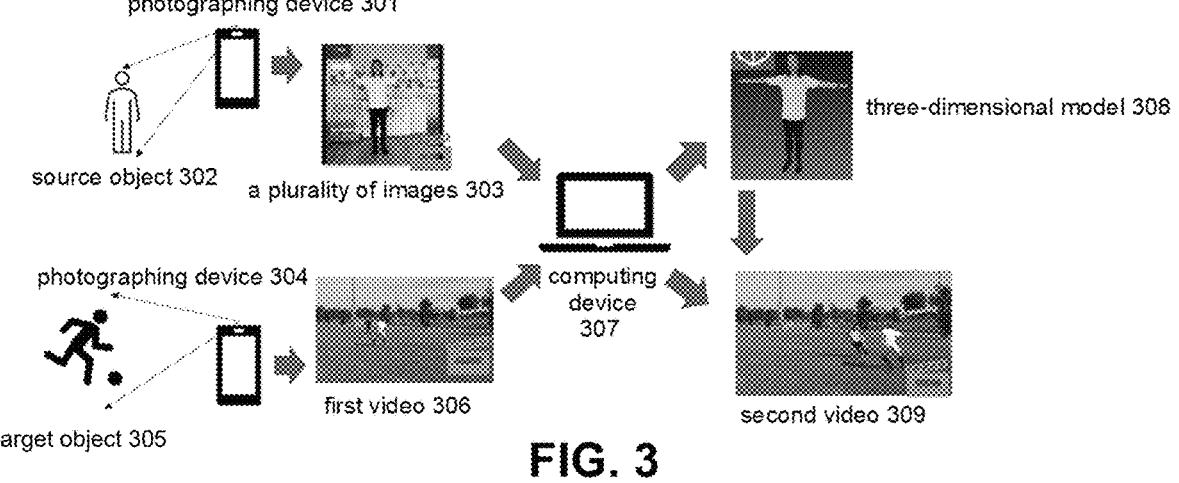
FIG. 3 is a schematic diagram illustrating image processing according to an embodiment of the present disclosure.

FIG. 3 is a schematic diagram illustrating image processing according to an embodiment of the present disclosure. In the embodiment shown in FIG. 3, the plurality of images come from the video data. As shown in FIG. 3, a photographing device 301 is used to photograph a source object 302 to obtain a plurality of images 303 containing the source object 302. A photographing device 304 is used to photograph a target object 305 to obtain a first video 306 containing the target object 305. The plurality of images 303 and the first video 306 are input to a computing device 307 capable of implementing the method of the present disclosure, and a three-dimensional model 308 for the source object and a plurality of animation models (not shown) for the target object can be obtained. As can be seen from FIG. 3, the three-dimensional model 308 contains rich visual information of the source object. The computing device 307 can fuse the three-dimensional model with the plurality of animation models to obtain a second video 309 for the source object.

For block 230, the present disclosure provides some more specific embodiments with respect to generating a three-dimensional model. FIG. 4 is a flow chart of a method 400 for generating a three-dimensional model according to an embodiment of the present disclosure, and the method 400 includes blocks 410-440. In block 410, a plurality of images are sampled to obtain a plurality of key image frames. In order to reduce the amount of computation and ensure the quality of the three-dimensional model, the key image frames can be selected for processing through sampling of multiple images without the necessity to use the visual information of each image. This can also improve the processing efficiency.

In block 420, a sparse point cloud for the target object is determined based on the plurality of key image frames. A point cloud is a data structure to represent the morphology of an object in three-dimensional space. It consists of a series of points, each point has a corresponding coordinate value, which indicates the position of this point in the three-dimensional space, and each point can also have other information values, such as color information, so that the point cloud can represent a three-dimensional model with colors. Sparse point cloud is a kind of point cloud. Compared with a dense point cloud, a sparse point cloud uses fewer points to show various visual information of the three-dimensional model. Generating sparse point clouds requires less computation, has lower requirements on hardware configuration, and has faster generation speed.

In some embodiments, for any two key image frames among a plurality of key image frames, first, the feature points in various key image frame are determined, and then the basic matrix of the key image frames is determined, which indicates the relative posture and depth information of the key image frames. Then, based on the basic matrix, feature points are matched, and a matched feature point indicates that this point belongs to the common information of various key image frames, so it can be used as a point in the sparse point cloud. Based on the matched feature points, a sparse point cloud for the source object is generated.

In block 430, a first model is trained according to a preset training condition based on the sparse point cloud for the target object. The sparse point cloud can be used as the basic information and reference for constructing a three-dimensional model, and a neural network for constructing three-dimensional models, such as a neural radiation field network, can be trained through the sparse point cloud. By iteratively training the first model, it can be enabled to predict the visual information not included in the plurality of images based on the plurality of images, so as to adjust and enrich the structure and information of the point cloud to enable it to represent the visual information of the source object more clearly and accurately.

In an embodiment, the preset training condition includes: iteratively training the first model for a first preset number of times based on the sparse point cloud of the target object; and reducing a learning rate of the first model in response to iterative training being performed for a second preset number of times, where the second preset number of times is less than the first preset number of times. For example, the first preset number of times can be set to 50,000 times, and the second preset number of times can be set to 5,000 times, 10,000 times, 15,000 times, 20,000 times, or the like. Additionally, the learning rate of the first model can be set to $1/(e^4)$. By adopting the training condition of the previous embodiment, a first model with good accuracy can be obtained quickly with limited computing resources.

In block 440, a three-dimensional model is determined using the trained first model based on the plurality of key image frames. After iterative training, the plurality of key image frames are input to the trained first model, and the trained first model can construct a three-dimensional model for the source object based on the existing visual information and predicted visual information of the plurality of key image frames.

Because the static three-dimensional model can represent the three-dimensional visual information of the source object more clearly and accurately than the dynamic model, it provides the necessary basis for the second video to clearly and accurately reproduce the actions of the target object as simulated by the source object.

For block 250, the present disclosure provides some specific embodiments. FIG. 5 is a flow chart of a method 500 for generating a plurality of animation models for a target object according to an embodiment of the present disclosure, and the method 500 includes blocks 510-540. In block 510, various video frames of the first video are sampled to obtain a plurality of key video frames. Similar to block 410, in order to reduce the amount of computation and ensure the quality of the animation model, the key video frames can be selected for processing through sampling of multiple images without the necessity to use the visual information of each image. This can also improve the processing efficiency.

In block 520, one animation model for the target object is generated using a second model based on one key video frame of the plurality of key video frames. The animation model is a three-dimensional model, which mainly represents the action information of the target object in this key video frame, and it is unnecessary to render other information, such as costumes, colors, and other visual information on the animation model. In this block 520, one key video frame is selected for generating the animation model, which can be the model basis of other animation models. In an embodiment, a Skinned Multi-Person Linear (SMPL) model can be used to generate one animation model for the target object.

In block 530, deformation information of the target object is extracted from each of the plurality of key video frames. In order to adjust the animation model obtained in block 520 to obtain the action of the target object represented by other key video frames, it is necessary to extract the deformation information of the target object from each key video frame as the main basis for adjusting the animation model.

In block 540, the one animation model for the target object is adjusted based on the deformation information of the target object in each key video frame to obtain the animation model of the target object in each key video frame. For example, if the animation model is generated based on the first key video frame, then in determining the animation model corresponding to the second key video frame, the deformation information of the target object can be extracted from the key video frame, and the deformation information can be converted into action parameters related to the animation model. After the action parameters are applied to the animation model, the animation model is modified, so that the action of the target object in the second key video frame can be presented, thereby obtaining the animation model corresponding to the second key video frame.

In this embodiment, because the key video frames are all directed to the target object, the main consideration in generating the animation model is the action information rather than the visual information, so one key video frame can be selected from the plurality of key video frames to generate the animation model, and the animation model can use the parameters related to the action information (i.e., the deformation information) to obtain the animation model with other actions, so it is unnecessary to generate one animation model for each key video frame, which can greatly save computing resources and improve computing efficiency.

In an embodiment, extracting deformation information of the target object from each of the plurality of key video frames includes: extracting posture information and shape information of the target object from each of the plurality of key video frames; and accordingly, adjusting the one animation model for the target object based on the deformation information of the target object in each key video frame, including for each key video frame, adjusting an animation model for the target object using the posture information and shape information of the target object extracted from the key video frame to obtain the animation model of the target object in each key video frame. As an example, the posture information can indicate the posture of the target object, such as standing, crouching, squatting, crawling, jumping, and the like, and the shape information can indicate the shape of the target object, such as height, body shape, body proportion, and the like.

Figure 6:
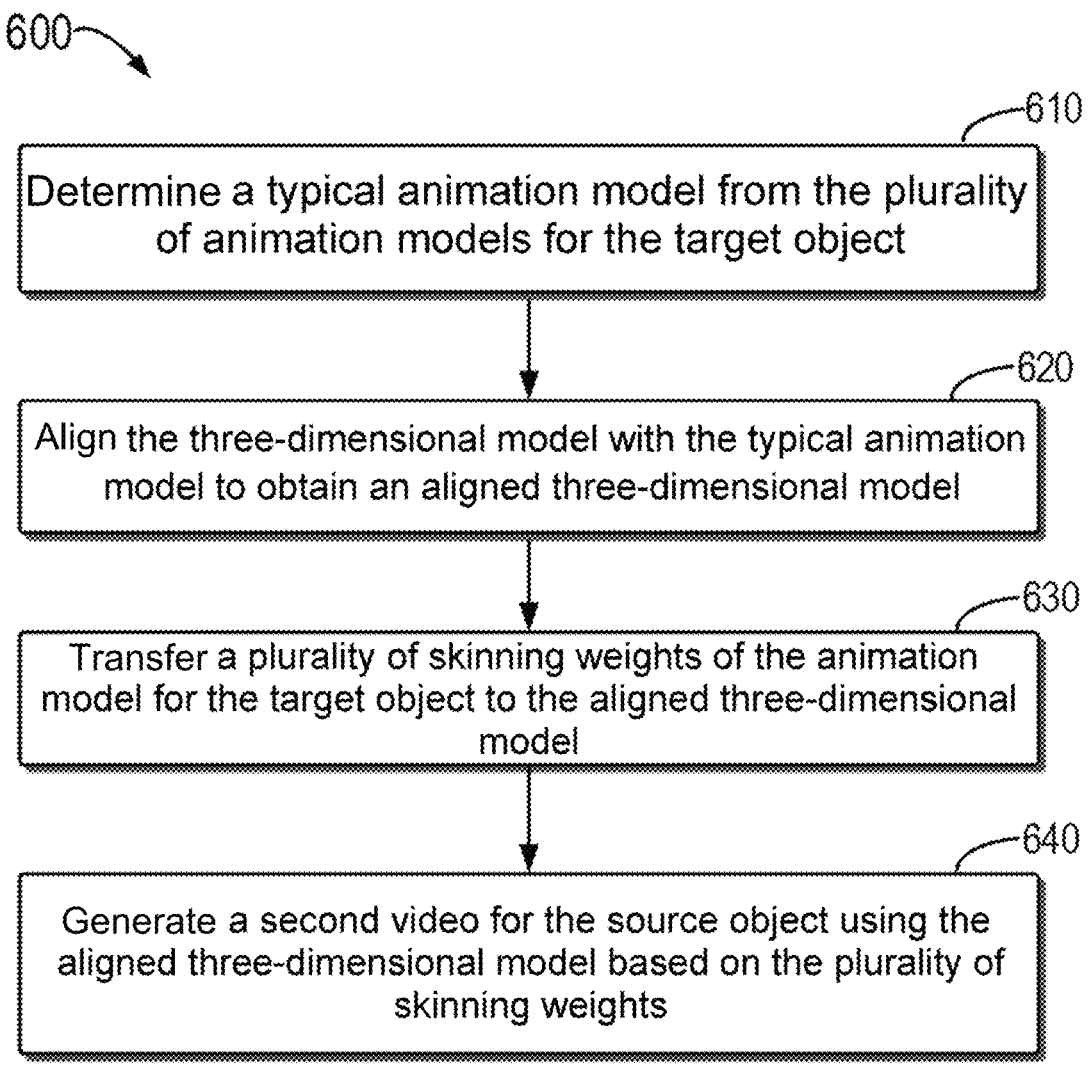
FIG. 6 is a flow chart of a method for fusing a three-dimensional model and a plurality of animation models according to an embodiment of the present disclosure.

For block 270, the present disclosure also provides some more specific embodiments. FIG. 6 is a flow chart of a method 600 for fusing a three-dimensional model and a plurality of animation models according to an embodiment of the present disclosure. In the embodiment shown in FIG. 6, the method 600 includes blocks 610-640. In block 610, a typical animation model is determined from the plurality of animation models for the target object. The typical animation model for the target object has a posture and shape consistent with the three-dimensional model for the source object. The fact that the typical animation model and the three-dimensional model have consistent postures is beneficial to their alignment. For example, the typical animation model and the three-dimensional model may be models in which the target object and the source object stand, respectively.

In block 620, the three-dimensional model is aligned with the typical animation model to obtain an aligned three-dimensional model. Usually, the three-dimensional model and the animation model are both represented by point clouds. In this case, this alignment does not need the exact coincidence between the corresponding points in the point clouds, as long as the point clouds are very similar to each other as a whole.

In block 630, a plurality of skinning weights of the animation models for the target object are transferred to the aligned three-dimensional model. Because the three-dimensional model is a static model, there are no parameters related to action adjustment, and the animation models have skinning weights as the parameters related to the action adjustment. Because both can be realized in the form of point clouds at the same time, the actions of the three-dimensional model can be adjusted by learning from a plurality of skinning weights of the plurality of animation models to turn it into a dynamic model. The skinning weight indicates the degree of correlation between the feature points in the point cloud and the bones of the model. By setting the skinning weight, adjustments can be made on the model to obtain the corresponding actions.

In block 640, a second video for the source object is generated using the aligned three-dimensional model based on the plurality of skinning weights. After the skinning weights are obtained, the aligned three-dimensional model can be taken as the object to be adjusted, causing the aligned three-dimensional model to make a series of actions, which are consistent with the actions made by the plurality of animation models described above. This series of actions are spliced into a video, and the second video is obtained. In this embodiment, by transferring the skinning weights of the animation models to the three-dimensional model, dynamic adjustment of the three-dimensional model, a static model, is realized, so that the source object accurately simulates a series of actions of the target object.

In an embodiment, aligning the three-dimensional model with the typical animation model includes: rotating the three-dimensional model by a first angle based on a rotation vector to obtain a first three-dimensional model, where the first angle is an angle indicated by the rotation vector; displacing the first three-dimensional model along a first direction by a first distance based on a displacement vector to obtain a second three-dimensional model, where the first direction and the first distance are the direction and the distance indicated by the displacement vector respectively; determining the distance between the second three-dimensional model and the typical animation model; and determining the second three-dimensional model as an aligned three-dimensional model for the source object in response to the distance being less than a preset threshold.

In this embodiment, the aligned three-dimensional model is represented by a point cloud, and the rotation and displacement of the three-dimensional model are completed by adjusting the coordinates of points in the point cloud. By the operations of rotation and displacement, the aligned three-dimensional model and typical animation model can be aligned, which is simple and accurate.

For example, the alignment operation can be performed according to the following Equation (1).

$$P' = R*P + T \tag{1}$$

where P' represents the aligned three-dimensional model, P represents the three-dimensional infinitesimal before alignment, R represents the rotation vector, and T represents the displacement vector.

In an embodiment, determining the distance between the second three-dimensional model and the typical animation model includes, for each point in the second three-dimensional model, determining the distance between the point and a corresponding point in the typical animation model as the first distance of the point; and determining the sum of the first distances of various points in the second three-dimensional model as the distance between the second three-dimensional model and the typical animation model. As illustrated above, when determining whether the point clouds are aligned, the sum of distances between corresponding points in the two point clouds can be calculated. A large sum means that they are not aligned, and a small sum means that they can be considered as aligned.

For example, the distance between the second three-dimensional model and the typical animation model can be determined according to the following Equation (2):

$$S = \sum_{i=1}^{N} (R * p_i + T - m_i)^2 \qquad (2)$$

where S represents the distance between the second three-dimensional model and the typical animation model, $p_i$ represents the coordinates of the ith point in the second three-dimensional model, N represents the total number of points in the second three-dimensional model, i is a positive integer, R represents the rotation vector, T represents the displacement vector, and $m_i$ represents the coordinates of the point corresponding to the ith point in the typical animation model. This method facilitates simply and accurately determining whether two point clouds are aligned.

In an embodiment, a second video for the source object is generated by using the aligned three-dimensional model based on the plurality of skinning weights, including controlling the aligned three-dimensional model based on the plurality of skinning weights to obtain a three-dimensional animation for the source object; and determining a two-dimensional projection of the three-dimensional animation for the source object from a preset perspective as a second video. Because the obtained three-dimensional scene can provide visual information from various perspectives, the two-dimensional projection can be carried out from any preset perspective, so that the second video from different perspectives can be obtained.

As an example, the aligned three-dimensional model is controlled according to Equation (3) to indirectly obtain a plurality of animation models for the source object:

$$T_p(\theta, \beta) = C + B_s(\beta) + B_p(\theta) \qquad (3)$$

where $\theta$ is the parameter representing the posture in the skinning weight, $\beta$ is the parameter representing the shape in the skinning weight, $T_p(\theta, \beta)$ is an aligned three-dimensional model with the posture $\theta$ and the shape $\beta$, C is the initial mixed weight of the aligned three-dimensional model, which indicates the initial parameters of the aligned three-dimensional model, $B_s(\beta)$ is the action information generated for the posture $\theta$, and $B_p(\theta)$ is the action information generated for the shape $\beta$.

Through the control approach of Equation (3), an aligned three-dimensional model generated can be dynamically controlled, so that the source object can simulate a series of actions of the target object. This avoids a large amount of model generation, which can save computing resources and improve the speed of generating the second video.

In an embodiment, the method for image processing further includes determining background information based on the first video, where the background information does not include the target object; and embedding the background information of the first video into the two-dimensional projection to obtain an optimized second video for the source object. By embedding the background information into the two-dimensional projection, the scene in the first video can be reproduced in the second video more realistically, thereby improving the user experience.

Figure 7:
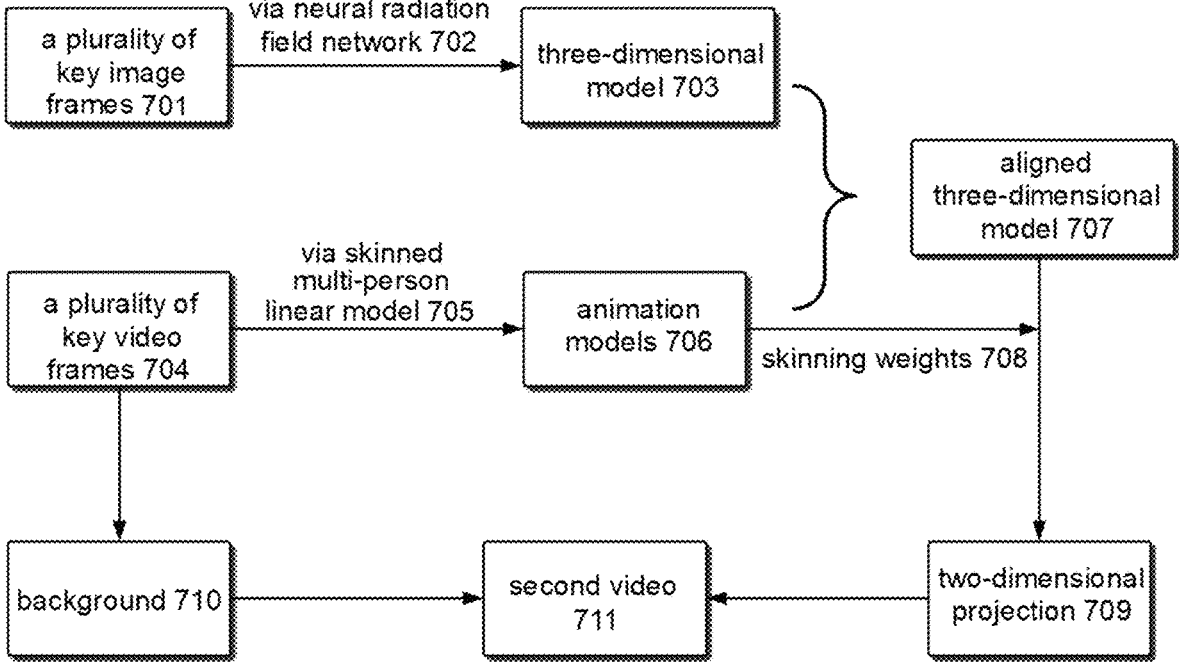
FIG. 7 is a schematic diagram illustrating image processing according to an embodiment of the present disclosure.

FIG. 7 is a schematic diagram illustrating image processing according to an embodiment of the present disclosure. In the embodiment shown in FIG. 7, a plurality of images (not shown) are sampled to obtain a plurality of key image frames 701, and the plurality of key image frames 701 are input to a neural radiation field network 702 to generate a three-dimensional model 703 for a source object.

In this process, a first video (not shown) can be sampled in parallel to obtain a plurality of key video frames 704, and the plurality of key video frames 704 can be input to a skinned multi-person linear model 705 to generate an animation models 706 for the target object. Then, the three-dimensional model 703 and the animation models 706 are aligned to obtain an aligned three-dimensional model 707. A skinning weight 708 corresponding to each key video frame 704 is extracted from the animation models 706, and the skinning weights 708 are transferred to the aligned three-dimensional model 707 for two-dimensional projection thereof to obtain a two-dimensional projection 709. The background 710 of each key video frame 704 is extracted from the plurality of key video frames 704 and inserted into the two-dimensional projection 709 respectively to obtain a second video 711.

Figure 8:
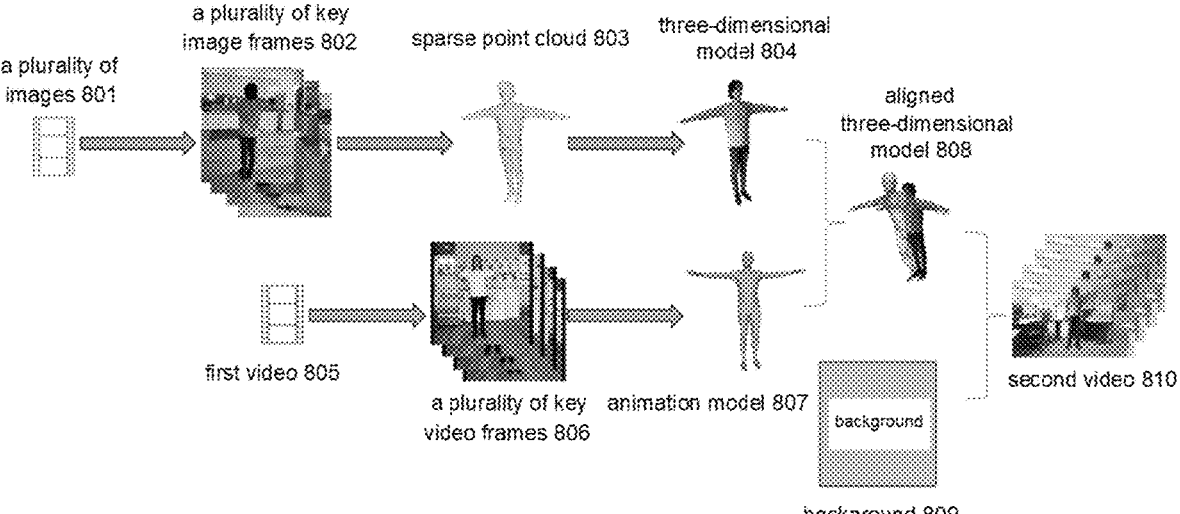
FIG. 8 is a schematic diagram illustrating image processing according to an embodiment of the present disclosure.

FIG. 8 is a schematic diagram illustrating image processing according to an embodiment of the present disclosure. In this embodiment, a plurality of images 801 are sampled to extract a plurality of key image frames 802, wherein the source object stands in a T-shaped posture in the plurality of key image frames 802. Then, a sparse point cloud 803 for the source object is generated, and the sparse point cloud 803 includes several points, each of which has coordinate information and color information. Using these points as training data, the neural radiation field network is iteratively trained, so that it has the ability to generate a three-dimensional model 804 based on the plurality of key image frames.

On the other hand, the first video 805 is sampled to obtain a plurality of key video frames 806, and animation models for the target object are generated via the skinned multi-person linear model. Here, the animation model 807 can be generated by using only the first key video frame. In the skinned multi-person linear model, a model for standing in a T-shaped posture is preset, and this model is used as the basis for a plurality of animation models. Furthermore, the posture information and shape information of the key video frames can be extracted from the plurality of key video frames 806 to generate skinning weights, and a series of actions of the target object can be obtained by adjusting the animation model 807 with the skinning weights.

The three-dimensional model 804 and the animation model 807 are fused by rotation and displacement vectors to obtain an aligned three-dimensional model 808. A second video 810 can be obtained by embedding the background 809 obtained from the plurality of key video frames 806 into the aligned three-dimensional model 808 in conjunction with the skinning weights.

Figure 9:
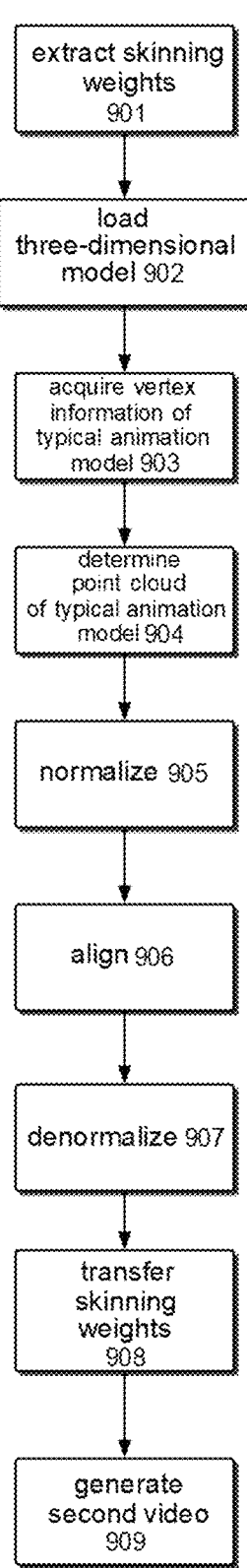
FIG. 9 is a flow chart of a method for generating a second video according to an embodiment of the present disclosure.

FIG. 9 is a flow chart of a method for generating a second video 909 according to an embodiment of the present disclosure. Skinning weights of a plurality of animation models are extracted at 901, the three-dimensional model for the source object is loaded at 902, vertex information of the typical animation model is acquired at 903, and a point cloud of the typical animation model is determined at 904 based on this vertex information. The point cloud of the three-dimensional model 902 and the point cloud of the typical animation model 904 are normalized at 905, and then the two point clouds are aligned at 906. After the alignment, the aligned three-dimensional model can be denormalized at 907, and the skinning weights obtained at 901 can be transferred to the aligned three-dimensional model at 908. A second video

909 can be generated by controlling the aligned three-dimensional model to make a series of actions through the skinning weights.

Figure 10:
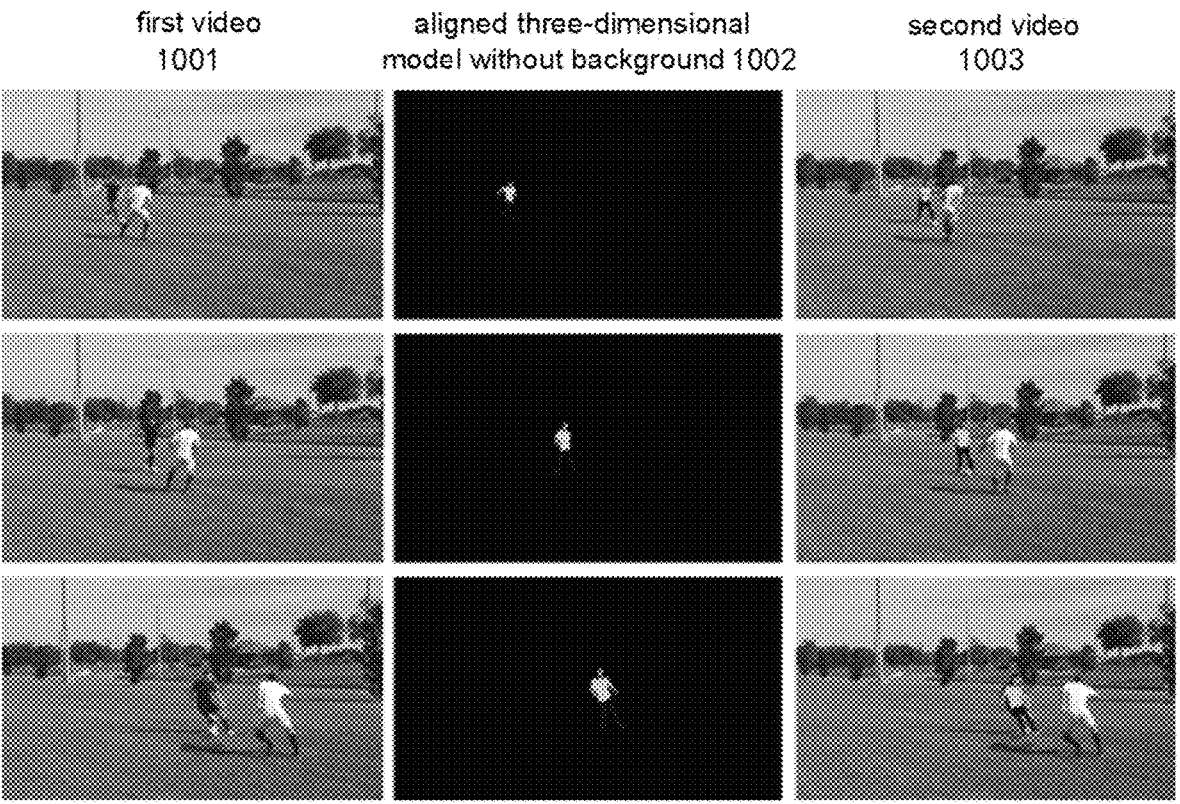
FIG. 10 is a schematic rendering including images of first and second videos according to an embodiment of the present disclosure.

FIG. 10 is a schematic rendering according to an embodiment of the present disclosure. As shown in FIG. 10, the first column on the left is the first video 1001, which represents a series of actions of the left object and the right object playing soccer. The second video generated according to embodiments of the present disclosure may be an aligned three-dimensional model without background shown at 1002, in which the left object in the first video 1001 as the target object is replaced with the source object. At 1003, a second video with a background is shown, which is different from 1002 in that the background is embedded. As can be seen from the rendering shown in FIG. 10, the source object can clearly and accurately simulate the action of the target object in the background of the first video.

Figure 11:
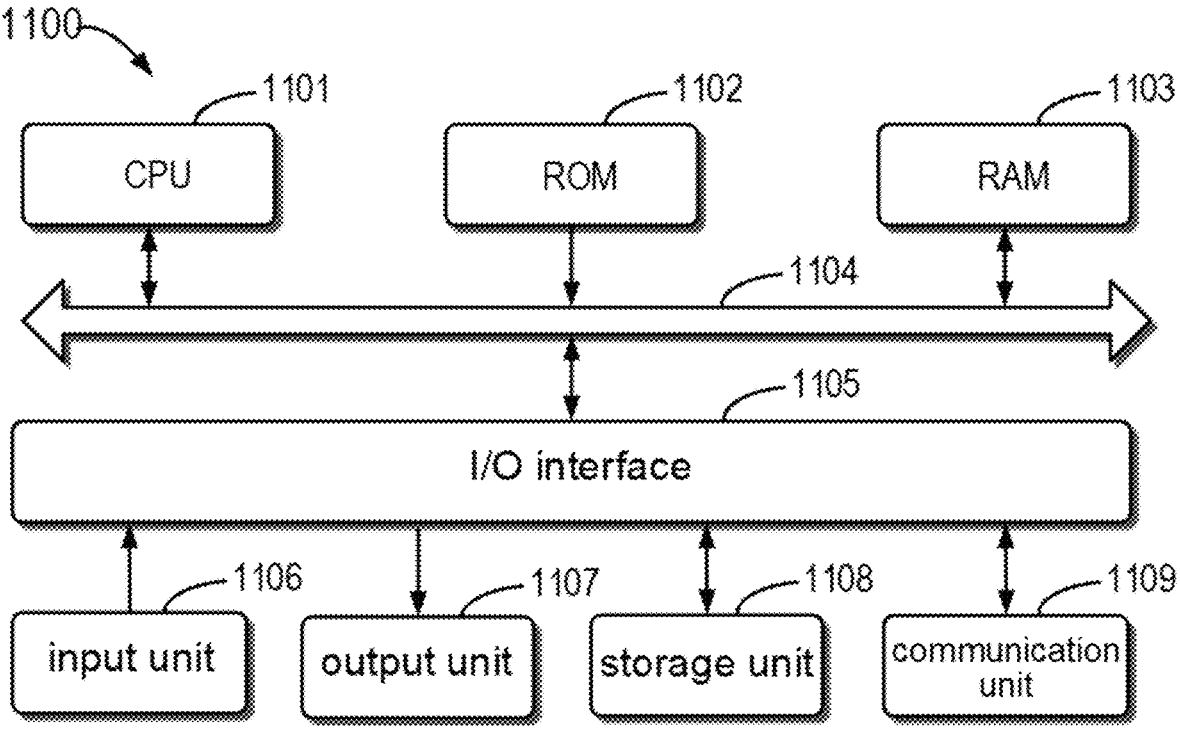
FIG. 11 is a block diagram of a device that can implement multiple embodiments of the present disclosure.

FIG. 11 is a block diagram of an example device 1100 that may be used to implement an embodiment of the present disclosure. As shown in the figure, the device 1100 includes a computation unit 1101, illustratively configured to include at least a Central Processing Unit (CPU), that can perform various appropriate actions and processing according to computer program instructions stored in a Read-Only Memory (ROM) 1102 or loaded from a storage unit 1108 into a Random Access Memory (RAM) 1103. Various programs and data required for the operation of the device 1100 may also be stored in the RAM 1103. The computation unit 1101, the ROM 1102, and the RAM 1103 are connected to each other through a bus 1104. An Input/Output (I/O) interface 1105 is also connected to the bus 1104.

A plurality of components in the device 1100 are connected to the I/O interface 1105, including: an input unit 1106, such as a keyboard and a mouse; an output unit 1107, such as various types of displays and speakers; the storage unit 1108, such as a magnetic disk and an optical disc; and a communication unit 1109, such as a network card, a modem, and a wireless communication transceiver. The communication unit 1109 allows the device 1100 to exchange information/data with other devices through a computer network such as the Internet and/or various telecommunication networks.

The computation unit 1101 may be various general-purpose and/or special-purpose processing components with processing and computing capabilities. Some examples of the computation unit 1101 include, but are not limited to, the above-noted CPU, a Graphics Processing Unit (GPU), various specialized Artificial Intelligence (AI) computing chips, various computation units for running machine learning model algorithms, a Digital Signal Processor (DSP), and any appropriate processor, controller, microcontroller, and the like. The computation unit 1101 executes various methods and processes described above, such as the method 200. For example, in some embodiments, the method 200 may be implemented as a computer software program that is tangibly included in a machine-readable medium, such as the storage unit 1108. In some embodiments, part or all of the computer program may be loaded and/or installed to the device 1100 via the ROM 1102 and/or the communication unit 1109. When the computer program is loaded to the RAM 1103 and executed by the computation unit 1101, one or more steps of the method 200 described above may be performed. Alternatively, in other embodiments, the computation unit 1101 may be configured to implement the method 200 in any other suitable manners (such as by means of firmware).

The functions described hereinabove may be performed at least in part by one or more hardware logic components. For example, without limitation, example types of hardware logic components that can be used include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program codes for implementing the method of the present disclosure may be written by using one programming language or any combination of a plurality of programming languages. These program codes may be provided to a processor or controller of a general purpose computer, a special purpose computer, or another programmable data processing apparatus, such that the program codes, when executed by the processor or controller, implement the functions/operations specified in the flow charts and/or block diagrams. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or use in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, this should not be construed as an indication that such operations are required to be performed in the particular order shown or in a sequential order, or as an indication that all illustrated operations should be performed to achieve desirable results. In certain environments, multitasking and parallel processing may be advantageous. Likewise, although the above discussion contains several specific implementation details, these should not be construed as limitations of the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the following claims is not necessarily limited to the specific features or actions described above. Rather, the specific features and actions described above are merely example forms of implementing the claims.

What is claimed is:

1. A method comprising:

implementing a processor-based machine learning system comprising at least first and second processing paths arranged in parallel with one another, with the first processing path comprising a first model and the second processing path comprising a second model different than the first model;

acquiring a plurality of images at an input of the first processing path and a first video at an input of the second processing path, wherein the plurality of images indicate visual information of a source object from a plurality of perspectives, and the first video indicates animation of a target object;

generating, utilizing the first model in the first processing path, a three-dimensional model for the source object based on the plurality of images, by applying key image frames of the plurality of images to an input of the first model, the first model providing at an output thereof the three-dimensional model for the source object;

generating, utilizing the second model in the second processing path, a plurality of animation models for the target object based on the first video, by applying key video frames of the first video to an input of the second model, the second model providing at an output thereof the plurality of animation models for the target object; and fusing the three-dimensional model for the source object and the plurality of animation models for the target object, at least in part by aligning one or more outputs of each of the first and second processing paths to provide an additional model different than the first and second models, to generate a second video for the source object, wherein in the second video, the target object in the first video is replaced with the source object;

wherein fusing the three-dimensional model for the source object and the plurality of animation models for the target object further comprises:

separating background information from at least a subset of the key video frames of the first video;

determining model weights of one or more of the plurality of animation models for the target object;

utilizing the model weights and the additional model to generate a two-dimensional projection; and combining at least portions of the background information and the two-dimensional projection to generate the second video.

2. The method according to claim 1, wherein generating a three- dimensional model for the source object based on the plurality of images comprises:

sampling the plurality of images to obtain a plurality of key image frames;

determining a sparse point cloud for the target object based on the plurality of key image frames;

training the first model according to a preset training condition based on the sparse point cloud for the target object; and determining the three-dimensional model using the trained first model based on the plurality of key image frames.

3. The method according to claim 2, wherein the preset training condition comprises:

iteratively training the first model for a first preset number of times based on the sparse point cloud of the target object; and reducing a learning rate of the first model in response to iterative training being performed for a second preset number of times, wherein the second preset number of times is less than the first preset number of times.

4. The method according to claim 1, wherein generating a plurality of animation models for the target object based on the first video comprises:

sampling various video frames of the first video to obtain a plurality of key video frames;

generating one animation model for the target object using the second model based on one key video frame of the plurality of key video frames;

extracting deformation information of the target object from each of the plurality of key video frames; and adjusting the one animation model for the target object based on the deformation information of the target object in each key video frame to obtain the animation model of the target object in each key video frame.

5. The method according to claim 4, wherein extracting deformation information of the target object from each of the plurality of key video frames comprises:

extracting posture information and shape information of the target object from each of the plurality of key video frames;

and adjusting the one animation model for the target object based on the deformation information of the target object in each key video frame comprises:

for each key video frame, adjusting the one animation model for the target object using the posture information and shape information of the target object extracted from the key video frame to obtain the animation model of the target object in each key video frame.

6. The method according to claim 4, wherein fusing the three-dimensional model for the source object and the plurality of animation models for the target object to generate a second video for the source object comprises:

determining a typical animation model from the plurality of animation models for the target object, wherein the typical animation model for the target object has a posture and shape consistent with the three-dimensional model for the source object;

aligning the three-dimensional model with the typical animation model to obtain an aligned three-dimensional model;

transferring a plurality of skinning weights of the animation models for the target object to the aligned three-dimensional model; and generating a second video for the source object using the aligned three-dimensional model based on the plurality of skinning weights.

7. The method according to claim 6, wherein aligning the three-dimensional model with the typical animation model comprises:

rotating the three-dimensional model by a first angle based on a rotation vector to obtain a first three-dimensional model, wherein the first angle is an angle indicated by the rotation vector;

displacing the first three-dimensional model along a first direction by a first distance based on a displacement vector to obtain a second three-dimensional model, wherein the first direction and the first distance are a direction and a distance indicated by the displacement vector respectively;

determining a distance between the second three-dimensional model and the typical animation model; and determining the second three-dimensional model as an aligned three-dimensional model for the source object in response to the distance being less than a preset threshold.

8. The method according to claim 7, wherein determining a distance between the second three-dimensional model and the typical animation model comprises:

for each point in the second three-dimensional model, determining a distance between the point and a corresponding point in the typical animation model as a first distance of the point; and determining a sum of first distances of various points in the second three-dimensional model as the distance between the second three-dimensional model and the typical animation model.

9. The method according to claim 6, wherein generating a second video for the source object by using the aligned three-dimensional model based on the plurality of skinning weights comprises:

controlling the aligned three-dimensional model based on the plurality of skinning weights to obtain a three-dimensional animation for the source object; and determining a two-dimensional projection of the three-dimensional animation for the source object from a preset perspective as the second video.

10. The method according to claim 9, further comprising:

determining background information based on the first video, wherein the background information does not include the target object; and embedding the background information of the first video into the two-dimensional projection as an optimized second video for the source object.

11. An electronic device, comprising:

at least one processor; and memory coupled to the at least one processor and having instructions stored therein, wherein the instructions, when executed by the at least one processor, cause the electronic device to perform actions comprising:

implementing a processor-based machine learning system comprising at least first and second processing paths arranged in parallel with one another, with the first processing path comprising a first model and the second processing path comprising a second model different than the first model;

acquiring a plurality of images at an input of the first processing path and a first video at an input of the second processing path, wherein the plurality of images indicate visual information of a source object from a plurality of perspectives, and the first video indicates animation of a target object;

generating, utilizing the first model in the first processing path, a three-dimensional model for the source object based on the plurality of images, by applying key image frames of the plurality of images to an input of the first model, the first model providing at an output thereof the three- dimensional model for the source object;

generating, utilizing the second model in the second processing path, a plurality of animation models for the target object based on the first video, by applying key video frames of the first video to an input of the second model, the second model providing at an output thereof the plurality of animation models for the target object; and fusing the three-dimensional model for the source object and the plurality of animation models for the target object, at least in part by aligning one or more outputs of each of the first and second processing paths to provide an additional model different than the first and second models, to generate a second video for the source object, wherein in the second video, the target object in the first video is replaced with the source object;

wherein fusing the three-dimensional model for the source object and the plurality of animation models for the target object further comprises:

separating background information from at least a subset of the key video frames of the first video;

determining model weights of one or more of the plurality of animation models for the target object;

utilizing the model weights and the additional model to generate a two-dimensional projection; and combining at least portions of the background information and the two-dimensional projection to generate the second video.

12. The electronic device according to claim 11, wherein generating a three-dimensional model for the source object based on the plurality of images comprises:

sampling the plurality of images to obtain a plurality of key image frames;

determining a sparse point cloud for the target object based on the plurality of key image frames;

training the first model according to a preset training condition based on the sparse point cloud for the target object; and determining the three-dimensional model using the trained first model based on the plurality of key image frames.

13. The electronic device according to claim 12, wherein the preset training condition comprises:

iteratively training the first model for a first preset number of times based on the sparse point cloud of the target object; and reducing a learning rate of the first model in response to iterative training being performed for a second preset number of times, wherein the second preset number of times is less than the first preset number of times.

14. The electronic device according to claim 11, wherein generating a plurality of animation models for the target object based on the first video comprises:

sampling various video frames of the first video to obtain a plurality of key video frames;

generating one animation model for the target object using the second model based on one key video frame of the plurality of key video frames;

extracting deformation information of the target object from each of the plurality of key video frames; and adjusting the one animation model for the target object based on the deformation information of the target object in each key video frame to obtain the animation model of the target object in each key video frame.

15. The electronic device according to claim 14, wherein extracting deformation information of the target object from each of the plurality of key video frames comprises:

extracting posture information and shape information of the target object from each of the plurality of key video frames;

and adjusting the one animation model for the target object based on the deformation information of the target object in each key video frame comprises:

for each key video frame, adjusting the one animation model for the target object using the posture information and shape information of the target object extracted from the key video frame to obtain the animation model of the target object in each key video frame.

16. The electronic device according to claim 14, wherein fusing the three- dimensional model for the source object and the plurality of animation models for the target object to generate a second video for the source object comprises:

determining a typical animation model from the plurality of animation models for the target object, wherein the typical animation model for the target object has a posture and shape consistent with the three-dimensional model for the source object;

aligning the three-dimensional model with the typical animation model to obtain an aligned three-dimensional model;

transferring a plurality of skinning weights of the animation models for the target object to the aligned three-dimensional model; and generating a second video for the source object using the aligned three-dimensional model based on the plurality of skinning weights.

17. The electronic device according to claim 16, wherein aligning the three- dimensional model with the typical animation model comprises:

rotating the three-dimensional model by a first angle based on a rotation vector to obtain a first three-dimensional model, wherein the first angle is an angle indicated by the rotation vector;

displacing the first three-dimensional model along a first direction by a first distance based on a displacement vector to obtain a second three-dimensional model, wherein the first direction and the first distance are a direction and a distance indicated by the displacement vector respectively;

determining a distance between the second three-dimensional model and the typical animation model; and determining the second three-dimensional model as an aligned three-dimensional model for the source object in response to the distance being less than a preset threshold.

18. The electronic device according to claim 17, wherein determining a distance between the second three-dimensional model and the typical animation model comprises:

for each point in the second three-dimensional model, determining a distance between the point and a corresponding point in the typical animation model as a first distance of the point; and determining a sum of first distances of various points in the second three-dimensional model as the distance between the second three-dimensional model and the typical animation model.

19. The electronic device according to claim 16, wherein generating a second video for the source object using the aligned three-dimensional model based on the plurality of skinning weights comprises:

controlling the aligned three-dimensional model based on the plurality of skinning weights to obtain a three-dimensional animation for the source object; and determining a two-dimensional projection of the three-dimensional animation for the source object from a preset perspective as the second video.

20. A computer program product comprising a non-transitory computer-readable medium having machine-executable instructions stored therein, wherein the machine-executable instructions, when executed by a machine, cause the machine to perform actions comprising:

implementing a processor-based machine learning system comprising at least first and second processing paths arranged in parallel with one another, with the first processing path comprising a first model and the second processing path comprising a second model different than the first model;

acquiring a plurality of images at an input of the first processing path and a first video at an input of the second processing path, wherein the plurality of images indicate visual information of a source object from a plurality of perspectives, and the first video indicates animation of a target object;

generating, utilizing the first model in the first processing path, a three-dimensional model for the source object based on the plurality of images, by applying key image frames of the plurality of images to an input of the first model, the first model providing at an output thereof the three-dimensional model for the source object;

generating, utilizing the second model in the second processing path, a plurality of animation models for the target object based on the first video, by applying key video frames of the first video to an input of the second model, the second model providing at an output thereof the plurality of animation models for the target object; and fusing the three-dimensional model for the source object and the plurality of animation models for the target object, at least in part by aligning one or more outputs of each of the first and second processing paths to provide an additional model different than the first and second models, to generate a second video for the source object, wherein in the second video, the target object in the first video is replaced with the source object;

wherein fusing the three-dimensional model for the source object and the plurality of animation models for the target object further comprises:

separating background information from at least a subset of the key video frames of the first video;

determining model weights of one or more of the plurality of animation models for the target object;

utilizing the model weights and the additional model to generate a two-dimensional projection; and combining at least portions of the background information and the two-dimensional projection to generate the second video.

\* \* \* \* \*